(12) United States Patent
Friour et al.

(10) Patent No.: US 7,604,342 B2
(45) Date of Patent: Oct. 20, 2009

(54) METHOD FOR TREATING AN INKJET RECORDING ELEMENT

(75) Inventors: Gerard A. Friour, Chalon-sur-Saône (FR); Olivier J. Poncelet, Chalon-sur-Saône (FR)

(73) Assignee: Eastman Kodak Company, Rochester, NY (US)

(*) Notice: Subject to any disclaimer, the term of this patent is extended or adjusted under 35 U.S.C. 154(b) by 124 days.

(21) Appl. No.: 11/573,148

(22) PCT Filed: Jul. 22, 2005

(86) PCT No.: PCT/EP2005/008009

§ 371 (c)(1),
(2), (4) Date: Feb. 2, 2007

(87) PCT Pub. No.: WO2006/013025

PCT Pub. Date: Feb. 9, 2006

(65) Prior Publication Data

US 2008/0097063 A1     Apr. 24, 2008

(30) Foreign Application Priority Data

Aug. 5, 2004  (FR) .................................. 04 08642

(51) Int. Cl.
*B41J 2/01* (2006.01)
(52) U.S. Cl. ...................... 347/101; 347/100; 347/105; 428/32.1; 428/32.34
(58) Field of Classification Search ................ 428/32.1, 428/32.34; 347/100–101, 105
See application file for complete search history.

(56) References Cited

U.S. PATENT DOCUMENTS

| | | | |
|---|---|---|---|
| 6,780,478 B2 * | 8/2004 | Steiger et al. | 428/32.32 |
| 2005/0253916 A1 * | 11/2005 | Poncelet et al. | 347/105 |
| 2006/0066707 A1 * | 3/2006 | Poncelet et al. | 347/106 |

FOREIGN PATENT DOCUMENTS

| | | |
|---|---|---|
| EP | 976571 | 2/2002 |
| EP | 1162076 | 9/2002 |
| WO | WO 2004009367 A1 * | 1/2004 |
| WO | WO 2004009368 A1 * | 1/2004 |

* cited by examiner

*Primary Examiner*—Randy Gulakowski
*Assistant Examiner*—Olatunde S Ojurongbe
(74) *Attorney, Agent, or Firm*—Chris P. Konkol; Arthur E. Kluegel; Andrew J. Anderson

(57) ABSTRACT

The present invention relates to a method for treating an inkjet recording element to improve the image quality of such an element. The method comprises the applying of a solution of an aluminosilicate polymer on said recording element, said aluminosilicate polymer being obtainable by a preparation method consisting in treating an aluminum halide with an alkyl orthosilicate only having hydrolisable substituents or with a mixture of at least one silicon alcoxide only having hydrolisable substituents and at least one silicon alcoxide having a non-hydrolisable substituent with an aqueous alkali in the presence of silanol groups, the aluminum concentration being maintained less than 0.3 mol/l, the Al/Si molar ratio being maintained between 1 and 3.6 and the alkali/Al molar ratio being maintained between 2.3 and 3; and then stirring the resulting mixture at ambient temperature in the presence of silanol groups for long enough to form the aluminosilicate polymer.

18 Claims, 3 Drawing Sheets

METHOD FOR TREATING AN INKJET RECORDING ELEMENT

FIELD OF THE INVENTION

The present invention relates to a method for treating an inkjet recording element to improve the quality of the printed image.

BACKGROUND OF THE INVENTION

Digital photography has been growing fast for several years and the general public now has access to efficient and reasonably priced digital cameras. Therefore people are seeking to be able to produce photographic prints from a simple computer and its printer, with the best possible quality.

Many printers, especially those linked to personal office automation, use the inkjet printing technique. There are two major families of inkjet printing techniques: continuous jet and drop-on-demand.

Continuous jet is the simpler system. Pressurized ink ($3.10^5$ Pa) is forced to go through one or more nozzles so that the ink is transformed into a flow of droplets. In order to obtain the most regular possible sizes and spaces between drops, regular pressure pulses are sent using for example a piezoelectric crystal in contact with the ink with high frequency (up to 1 MHz) alternating current (AC) power supply. So that a message can be printed using a single nozzle, every drop must be individually controlled and directed. Electrostatic energy is used for this: an electrode is placed around the inkjet at the place where drops form. The jet is charged by induction and every drop henceforth carries a charge whose value depends on the applied voltage. The drops then pass between two deflecting plates charged with the opposite sign and then follow a given direction, the amplitude of the movement being proportional to the charge carried by each of them. To prevent other drops from reaching the paper, they are left uncharged: so, instead of going to the support they continue their path without being deflected and go directly into a container. The ink is then filtered and can be reused.

The other category of inkjet printer is drop-on-demand (DOD). This constitutes the basis of inkjet printers used in office automation. With this method, the pressure in the ink cartridge is not maintained constant but is applied when a character has to be formed. In one widespread system there is a row of 12 open nozzles, each of them being activated by a piezoelectric crystal. The ink contained in the head is given a pulse: the piezo element contracts with an electric voltage, which causes a decrease of volume, causing the expulsion of the drop by the nozzle. When the element resumes its initial shape, it pumps into the reservoir the ink necessary for new printings. The row of nozzles is thus used to generate a column matrix, so that no deflection of the drop is necessary. One variation of this system consists in replacing the piezoelectric crystals by small heating elements behind each nozzle. The drops are ejected following the forming of bubbles of solvent vapor. The volume increase enables the expulsion of the drop. Finally, there is a pulsed inkjet system in which the ink is solid at ambient temperature. The print head thus has to be heated so that the ink liquefies and it can print. This enables rapid drying on a wider range of products than conventional systems.

There now exist new "inkjet" printers capable of producing photographic images of excellent quality. However, they cannot supply good proofs if inferior quality printing paper is used. The choice of printing paper is fundamental for the quality of the obtained image. The printing paper must combine the following properties: high-quality printed image, rapid drying during printing, good image colorfastness over time, and smooth and glossy appearance.

In general, the printing paper comprises a support coated with one or more layers according to the properties required. Two main technologies have been developed. On the one hand, there is a non-porous printing paper, usually comprising layers of polymers, such as gelatin. This paper enables images that are glossy and ozone stable to be obtained because, once the polymer layer is dry, permeability to ozone is low. However, these papers, not being porous, have to swell to absorb the ink. This swelling slows ink absorption so that the ink can easily run just after printing.

Another paper has been developed to obtain a paper with rapid drying in order to increase printing output rates. This is a paper comprising a porous ink-receiving layer comprising fillers. This porous paper absorbs the ink rapidly thanks to the pores existing between the fillers. The paper can also comprise a primary tie layer as well as a protective layer or surface layer to ensure the material's glossiness. The protective layer is designed to ensure protection against fingerprints and the pressure marks of the printer feed rollers.

The porous ink-receiving layer comprises fillers used as receiving agent and a polymer binder. It enables the liquid part of the water-based ink composition to be absorbed after image creation. Elimination of the liquid reduces the risk of ink migration at the surface. The ink-receiving layer also prevents any dye loss in the fibers of the paper base to obtain good color saturation while preventing excess ink that would encourage the increase in size of the printing dots and reduce the image quality.

The purpose of the receiving agent is to fix the dyes in the printing paper. The best-known inorganic receivers are colloidal silica or boehmite. For example, European Patent Applications EP-A-976,571 and EP-A-1,162,076 describe materials for inkjet printing in which the ink-receiving layer contains as inorganic receivers Ludox™ CL (colloidal silica) marketed by Grace Corporation or Dispal™ (colloidal boehmite) marketed by Sasol. However, printing paper comprising a porous ink-receiving layer can have poor ozone stability in time, which is demonstrated by a loss of color density. In particular this is due to the fact that the fillers are easily accessible to ozone and the surface of these fillers could catalyze the ozone degradation of the ink dyes.

To meet new market needs in terms of color stability to ozone, it is necessary to propose a method for treating an inkjet recording element enabling the improvement of the printed image quality, and more particularly of the color stability to ozone of the printed image, and of the glossiness.

SUMMARY OF THE INVENTION

The treatment method for treating an inkjet recording element according to the present invention comprises the applying a solution of an aluminosilicate polymer onto said recording element, said aluminosilicate polymer being obtainable by a preparation method that comprises the following steps:

a) treating a mixed aluminum and silicon alcoxide of which the silicon has at least three hydrolisable substituents, or a mixed aluminum and silicon precursor resulting from the hydrolysis of a mixture of aluminum compounds and silicon compounds only having hydrolisable substituents and silicon compounds having at least three hydrolisable substituents, with an aqueous alkali, in the presence of silanol groups, the aluminum concentration being maintained at less than 0.3 mol/l, the Al/Si molar ratio being maintained between 1 and 3.6 and the alkali/Al molar ratio being maintained between 2.3 and 3;

b) stirring the mixture resulting from step a) at ambient temperature in the presence of silanol groups long enough to form the aluminosilicate polymer; and c) eliminating the byproducts formed during steps a) and b) from the reaction medium.

Throughout the present description, the expression "hydrolisable substituent" means a substituent eliminated by hydrolysis during the method and in particular at the time of the treatment with the aqueous alkali. This means that when the silicon atom only has three hydrolisable substituents, it also has a non-hydrolisable substituent that does not separate from the silicon atom during the method and in particular at the time of the treatment with the aqueous alkali. Such substituents are for example hydrogen, fluoride or an organic group.

In the following, the expression "unmodified mixed aluminum and silicon alcoxide" or "unmodified mixed aluminum and silicon precursor" means respectively a mixed aluminum and silicon alcoxide only having hydrolisable substituents, or a mixed aluminum and silicon precursor resulting from the hydrolysis of a mixture of aluminum compounds and silicon compounds only having hydrolisable substituents.

The expression "modified mixed aluminum and silicon alcoxide" means a mixed aluminum and silicon alcoxide in which the aluminum atom only has hydrolisable substituents and the silicon atom has three hydrolisable substituents and one non-hydrolisable substituent.

Similarly, the expression "modified mixed aluminum and silicon precursor" means a precursor resulting from the hydrolysis of a mixture of aluminum compounds and silicon compounds only having hydrolisable substituents and silicon compounds having three hydrolisable substituents and one non-hydrolisable substituent This non-hydrolisable substituent enables a hybrid aluminosilicate polymer material to be obtained.

More generally, an "unmodified" compound is a compound that only comprises hydrolisable substituents and a "modified" compound is a compound that comprises one non-hydrolisable substituent.

The treatment method according to the invention can be applied to all inkjet recording elements available on the market and enables the improvement of the image quality of these existing elements that initially have insufficient stability to ozone and glossiness.

DETAILED DESCRIPTION OF THE INVENTION

Figure 1:
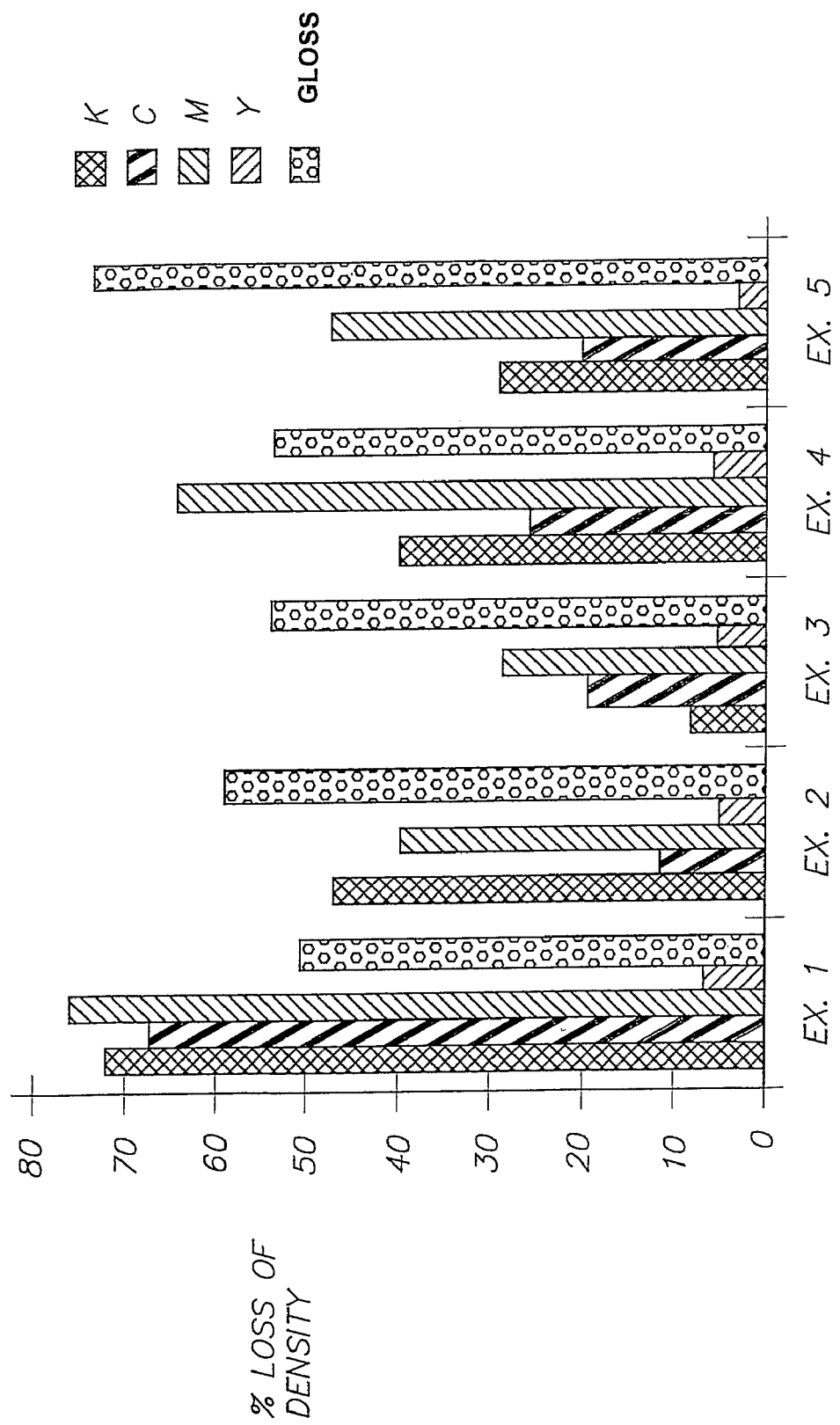
FIGS. 1 to 3 represent the glossiness and percentage of color density loss for various comparative recording elements and treated according to the present invention exposed to ozone.

The method for treating an inkjet recording element according to the present invention comprises the applying of a solution of an aluminosilicate polymer onto said recording element, said aluminosilicate polymer being obtainable by a preparation method that comprises the following steps:

a) treating a mixed aluminum and silicon alcoxide which only has hydrolisable substituents, or an unmodified mixed aluminum and silicon precursor resulting from the hydrolysis of a mixture of aluminum compounds and silicon compounds only having hydrolisable substituents, or a mixed aluminum and silicon alcoxide whose silicon has both hydrolisable substituents and one non-hydrolisable substituent, or a modified mixed aluminum and silicon precursor resulting from the hydrolysis of a mixture of aluminum compounds and silicon compounds only having hydrolisable substituents and silicon compounds having three hydrolisable substituents and one non-hydrolisable substituent, with an aqueous alkali, in the presence of silanol groups, the aluminum concentration being maintained at less than 0.3 mol/l, the Al/Si molar ratio being maintained between 1 and 3.6 and the alkali/Al molar ratio being maintained between 2.3 and 3;

b) stirring the mixture resulting from step a) at ambient temperature in the presence of silanol groups long enough to form the aluminosilicate polymer; and c) eliminating the byproducts formed during steps a) and b) from the reaction medium.

Such an aluminosilicate polymer is described in Patent Applications WO 2004/039724 and WO 2004/09494, hereby incorporated by reference in their entirety.

According to one embodiment, the unmodified mixed aluminum and silicon precursor is used that can be formed in situ by mixing in aqueous medium (i) one compound selected from the group consisting of aluminum salts, aluminum alcoxides and aluminum halogenoalcoxides and (ii) at least one compound selected from the group consisting of silicon alcoxides and chloroalcoxides only having hydrolisable substituents, the silicon compound having at least three hydrolisable substituents being selected to only have hydrolisable substituents. The alcoxide radical of the unmodified aluminum compound or silicon compound preferably contains 1 to 5 carbon atoms, such as methoxide, ethoxide, n-propoxide, or i-propoxide.

Preferably, an aluminum salt, such as a halide (e.g. chloride or bromide), a perhalogenate, a sulfate, a nitrate, a phosphate or a carboxylate, and at least one unmodified silicon alcoxide, such as tetramethyl or tetraethyl orthosilicate is used.

A single unmodified silicon alcoxide or a mixture of unmodified silicon alcoxides, or a single unmodified silicon chloroalcoxide or a mixture of unmodified silicon chloroalcoxides, or a mixture of unmodified silicon alcoxides and chloroalcoxides can be used.

Preferably, an aluminum halide, such as chloride, and an unmodified silicon alcoxide only having hydrolisable substituents is used. In practice, the mixture is made at room temperature between 15° C. and 35° C., preferably between 20° C. and 25° C., by adding the silicon alcoxide, pure or diluted in a co-solvent such as an alcohol, to the aluminum salt in aqueous solution, with stirring, until a clear homogeneous mixture is obtained. An unmodified mixed aluminum and silicon precursor is thus obtained. The stirring time varies from 10 to 180 minutes, and is preferably 120 minutes.

According to another embodiment of the method used in the present invention, a modified mixed aluminum and silicon precursor is used that is formed in situ by mixing in aqueous medium (i) one compound selected from the group consisting of aluminum salts, aluminum alcoxides and aluminum halogenoalcoxides and (ii) at least one compound selected from the group consisting of unmodified silicon alcoxides and chloroalcoxides having only hydrolisable substituents, and (iii) at least one compound selected from the group consisting of modified silicon alcoxides and chloroalcoxides having three hydrolisable substituents and one non-hydrolisable substituent.

The modified or unmodified alcoxide radical of the aluminum compound or silicon compound preferably contains 1 to 5 carbon atoms, such as methoxide, ethoxide, n-propoxide, or i-propoxide.

Preferably, an aluminum salt is used, such as a halide (e.g. chloride or bromide), a perhalogenate, a sulfate, a nitrate, a phosphate or a carboxylate. An aluminum halide, such as chloride, is particularly preferred.

Preferably, silicon compounds are used in the form of alcoxides.

A single unmodified silicon alcoxide or a mixture of unmodified silicon alcoxides, or a single unmodified silicon chloroalcoxide or a mixture of unmodified silicon chloroalcoxides, or a mixture of unmodified silicon alcoxides and chloroalcoxides can be used. Similarly, a single modified silicon alcoxide or a mixture of modified silicon alcoxides, or a single modified silicon chloroalcoxide or a mixture of modified silicon chloroalcoxides, or a mixture of modified silicon alcoxides and chloroalcoxides can be used.

Preferably, a mixture (i) of an aluminum halide and (ii) a mixture comprising at least one unmodified silicon alcoxide having only hydrolisable substituents and at least one modified silicon alcoxide having three hydrolisable substituents and one non-hydrolisable substituent are produced.

An unmodified silicon alcoxide can be represented by the formula Si-$(OR)_4$, and a modified silicon alcoxide having three hydrolisable substituents and one non-hydrolisable substituent can be represented by the formula

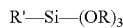

where R represents an alkyl group comprising 1 to 5 carbon atoms

R' represents H, F, or a substituted or unsubstituted linear or ramified alkyl or alkenyl group, comprising 1 to 8 carbon atoms, e.g. a methyl, ethyl, n-propyl, n-butyl, 3-chloropropyl group, or a vinyl group.

Preferably, the unmodified silicon alcoxide is tetramethyl or tetraethyl orthosilicate, and the modified silicon alcoxide is methyltriethoxysilane or vinyltriethoxysilane.

The ratio of unmodified silicon alcoxide to modified silicon alcoxide is between 0.1 and 10 in moles of silicon, and is preferably about 1.

In practice, the unmodified silicon alcoxide and modified silicon alcoxide mixture is first produced pure or diluted in a co-solvent such as an alcohol. Said alcohol is preferably ethanol, used in sufficient amount to obtain a clear homogeneous mixture once the silicon compounds are mixed with the aluminum compound. Then, this mixture is added to the aluminum salt in aqueous solution, with stirring, at room temperature between 15° C. and 35° C., preferably between 20° C. and 25° C., until a clear homogeneous mixture is obtained. A modified mixed aluminum and silicon precursor is thus obtained. The stirring time varies from 10 to 240 minutes, and is preferably 120 minutes.

According to step a) of the method for preparing the aluminosilicate polymer useful in the present invention, the precursor or an unmodified or modified mixed aluminum and silicon alcoxide is then put in contact with an aqueous alkali, the aluminum concentration being maintained at less than 0.3 mol/l, the Al/Si molar ratio being maintained between 1 and 3.6, and the alkali/Al molar ratio being maintained between 2.3 and 3. Advantageously, the aluminum concentration is between $1.5\times10^{-2}$ and 0.3 mol/l and even more preferably between $4.4\times10^{-2}$ and 0.3 mol/l. Preferably, the Al/Si molar ratio is between 1 and 2.

Preferably, an aqueous solution of sodium, potassium, or lithium hydroxide, diethylamine or triethylamine, with a concentration between 0.5M and 3M, and preferably 3M is used. The alkali can also be in the form of a hydroalcoholic solution.

The alkali is added to the precursor or to the unmodified or modified mixed aluminum and silicon alcoxide at a rate preferably between 50 and 650 mmole/hour.

The alkali in step a) is added in the presence of silanol groups. These groups can be supplied by glass or silica (glass wool) particles or beads, which have superficial hydroxy groups. When the volume of liquid to be treated is large, it may be desirable to increase the quantity of beads. The diameter of the beads can be between 0.2 and 5 mm and preferably between 1 and 3 mm. To simplify the implementation of the method for preparing the aluminosilicate polymer useful in the present invention, the preparation of the mixed aluminum and silicon precursor can also be performed in the presence of silanol groups, for example by circulating the mixture in a bed of glass beads.

After the addition of the alkali, step b) of the method for preparing the aluminosilicate polymer useful in the present invention consists in stirring the mixture resulting from step a) at ambient temperature in the presence of silanol groups long enough to form said aluminosilicate polymer.

Then, step c) of the method for preparing the aluminosilicate polymer useful in the present invention consists in eliminating from the reaction medium the byproducts formed during steps a) and b), such as the residual ions coming essentially from the alkali used in step a). The residual ions can be eliminated by washing, by successive sedimentations or by diafiltration. The aluminosilicate polymer resulting from step c) can then be concentrated by centrifugation or nanofiltration.

When modified compounds are used comprising a non-hydrolisable substituent, a hybrid aluminosilicate polymer is obtained. The introduction of non-hydrolisable substituents, such as organic functions, enables providing for example an organophilic character to the resulting hybrid aluminosilicate polymers.

In a first embodiment of the method for preparing the aluminosilicate polymer useful in the present invention, during step a) a quantity of alkali is added in order to obtain an alkali/Al molar ratio of about 2.3. In this case the pH is maintained between 4 and 5, and preferably between 4.2 and 4.3. Then step b) as described above is applied. The aluminosilicate polymer useful in the present invention is thus obtained as a dispersion. Step c) to eliminate the residual ions can then be performed by diafiltration, followed by nanofiltration concentration.

In a second embodiment of the method for preparing the aluminosilicate polymer useful in the present invention, during step a) a quantity of alkali is added in order to obtain an alkali/Al molar ratio of about 3. Then step b) as described above is applied. The aluminosilicate polymer useful in the present invention is thus obtained as a suspension. Step c) to eliminate the residual ions can then be performed by diafiltration, followed by nanofiltration concentration, the aluminosilicate polymer having been previously redispersed by adding acid, such as hydrochloric or acetic acid or a mixture thereof.

In a third embodiment, the method for preparing the aluminosilicate polymer useful in the present invention comprises an additional step d), after step b) and before step c). Said step d) consists in adding in a few minutes an additional quantity of aqueous alkali to reach an alkali/Al molar ratio of 3 if this ratio had not already been reached during step a). The aluminosilicate polymer useful in the present invention is thus obtained as a suspension. Step c) to eliminate the residual ions can then be performed by diafiltration, followed by nanofiltration concentration, the aluminosilicate polymer having been previously redispersed by adding hydrochloric acid. Step c) can also be performed by washing with osmosed water by successive sedimentations, followed by centrifugation concentration.

The aluminosilicate polymer useful in the present invention resulting from step c) followed by a concentration has physical gel form. The Al/Si molar ratio is between 1 and 3.6. Subsequent lyophilisation enables the aluminosilicate polymer useful in the present invention to be obtained as a powder. Such an aluminosilicate polymer can be characterized in that its Raman spectrum comprises in spectral region 200-600 $cm^{-1}$ a wide band at $250\pm6$ $cm^{-1}$, a wide intense band at $359\pm6$ $cm^{-1}$, a shoulder at $407\pm7$ $cm^{-1}$, and a wide band at $501\pm6$ $cm^{-2}$, the Raman spectrum being produced for the aluminosilicate polymer resulting from step b) and before step c) and lyophilized. When modified compounds are used and when a hybrid aluminosilicate polymer is obtained, the Raman spectrum also comprises bands corresponding to the non-hydrolisable silicon substituent, the bands linked to the non-hydrolisable silicon substituent being capable of juxtaposing with the other bands.

The aluminosilicate polymer prepared as a powder is then put into aqueous solution. If the aluminosilicate polymer is obtained as a gel, the gel is diluted with water to obtain the required concentration. When the aluminosilicate polymer as obtained above is used as a powder, this powder must be very fine.

The aqueous solution of aluminosilicate polymer preferably contains between 1 percent and 20 percent and preferably between 5 percent and 10 percent of aluminosilicate polymer.

Alcohols or ketones can also be used as solvents.

The aluminosilicate polymer solution can also contain additives know to those skilled in the art to further improve the quality of the image obtained, such as surfactants.

The aluminosilicate polymer solution is then applied onto a previously existing inkjet recording element, available on the market and marketed as ready to be printed on.

This inkjet recording element can be a paper for inkjet printing with polymer layers. These layers essentially comprise polymers, gelatin and cellulose and are highly hydrophilic. They absorb the ink by swelling.

The inkjet recording element intended for forming images by inkjet printing can also be a paper for inkjet printing with nanoporous layers.

Such a recording element firstly comprises a support generally comprised of a cellulose fiber paper base, both sides of which are coated with a polyethylene layer. The recording element then comprises at least one nanoporous ink-receiving layer comprising at least one hydrosoluble binder and fillers. Said hydrosoluble binder can be a hydrophilic polymer such as polyvinyl alcohol, poly(vinyl pyrrolidone), gelatin, cellulose ethers, poly(oxazolines), poly(vinylacetamides), poly (vinyl acetate/vinyl alcohol) partially hydrolised, poly (acrylic acid), poly(acrylamide), sulfonated or phosphated polyesters and polystyrenes, casein, zein, albumin, chitin, dextran, pectin, derivatives of collagen, agar-agar, guar, carragheenan, tragacanth, xanthan and others. Preferably, gelatin or polyvinyl alcohol is used.

The fillers can be inorganic. The inorganic fillers currently used are silica, talc, clay, hydrotalcite, kaolin, diatomite, calcium carbonate, magnesium carbonate, aluminum oxide, titanium oxide, zinc oxide, barium sulfate, calcium sulfate, aluminosilicates, boehmite (hydrated alumina). The most used inorganic fillers are silica, alumina and boehmite.

The fillers can also be organic particles, such as polystyrene, methyl polymethacrylate, silicones, polyesters and polyamides. Mixtures of organic and inorganic fillers can be used. However, the most common fillers are inorganic fillers.

An inkjet recording element can comprise, besides the ink-receiving layer described above, other layers having another function, arranged above or below said ink-receiving layer. In particular it is possible to provide an antistatic or anti-winding layer on the back of the support coated with the ink-receiving layer. The ink-receiving layer as well as the other layers can comprise any other additives known to those skilled in the art to improve the properties of the resulting image, such as UV ray absorbers, optical brightening agents, antioxidants, plasticizers, etc.

According to the method of the present invention, the aluminosilicate polymer solution is applied to an existing inkjet recording element, that for example may be found commercially under many different brands of "photo" inkjet papers.

This means that, according to the method of the present invention, the aluminosilicate polymer solution is applied to the top layer making up the printing surface of the inkjet recording element, and this whatever the composition of said top layer.

The aluminosilicate polymer solution can be applied to the recording element before or after printing on said element, i.e. on the virgin surface of the recording element or on the already-printed surface.

The aluminosilicate polymer solution can be applied by any method known to those skilled in the art, for example by dipping in a bath containing the aluminosilicate polymer solution and drying, or by spraying. To do this, for example the inkjet printer print head can be equipped with means to spray the aluminosilicate polymer solution onto the inkjet recording element just before or just after the ink is expelled.

The method according to the present invention enables any inkjet recording element to be covered with a final layer of aluminosilicate polymer. The images printed on this material then have better quality, in particular greater color stability to ozone, and improved glossiness.

The method according to the invention has the advantage of being capable of treating any type of inkjet recording element. Thus the method according to the invention enables inkjet recording elements to be obtained having good image quality whereas they initially have insufficient stability to ozone and glossiness.

The following examples illustrate the present invention without however limiting its scope.

1) Preparation of Aluminosilicate Polymer 4.53 moles $AlCl_3$, $6H_2O$, then 2.52 moles tetraethyl orthosilicate were added to 100 l osmosed water. This mixture was stirred and circulated simultaneously through a bed formed of 1 kg of glass beads 2-mm diameter using a pump with 8 l/min output. The preparation operation of the unmodified mixed aluminum and silicon precursor took 120 minutes. Then, according to step a) of the preparation method, 10.5 moles NaOH 3M were added to the precursor in two hours. The reaction medium clouded. According to step b) of the preparation method, the mixture was stirred for 15 to 20 hours. The medium became clear. The circulation was stopped in the glass bead bed. Then, according to step d) of the method used in the present invention, 3.09 moles NaOH 3M were added in ten minutes. The aluminum concentration was $4.4\times10^{-2}$ mol/l, Al/Si molar ratio 1.8 and alkali/Al ratio 3. The aluminosilicate polymer used in the present invention was thus obtained as a suspension. Step c) of the preparation method consisted in adding 165 g HCl 37 percent first diluted 10 times and stirring for 150 minutes to obtain a dispersion of the aluminosilicate polymer that was left to stand. The dispersion was then diafiltrated using a Filmtec NF 2540 nanofiltration membrane (surface area 6 m$^2$) to eliminate the sodium salts to achieve an Al/Na ratio greater than 100. The retentate resulting from the diafiltration by nanofiltration was concentrated to obtain a gel with about 2 percent by weight of aluminum. 115 g of HCl 37 percent was added to 2 kg of this gel, and then 317 g of water, i.e. 15 percent of the weight of the gel engaged, was distilled. A gel was obtained that was then lyophilized to obtain a solid of constant mass. The aluminosilicate polymer used in the present invention was then obtained as a powder (230 g).

2) Preparation of the Aluminosilicate Polymer Solution

Two aqueous solutions of the aluminosilicate polymer were prepared as described in paragraph 1. The composition is given in table I:

TABLE I

|  | Solution 1 | Solution 2 |
|---|---|---|
| Aluminosilicate polymer | 2.5 g | 5 g |
| Pure water | 50 g | 50 g |
| Polymer concentration | 5% | 10% |

3) Treatment of Inkjet Recording Elements

The treatment method according to the present invention was implemented for three photographic quality inkjet papers available commercially: Canon PRO PR101 (245 g/m$^2$), Fuji Super Photograde WPA420 (245 μm) and Tetenal "high glossy" 131368 (264 g/m$^2$) papers.

a) Treatment Before Printing

One sample of each of the papers was dipped in solution 1 as described in paragraph 2 for ten seconds, dried and then printed.

One sample of each of the papers was dipped in solution 2 as described in paragraph 2 for ten seconds, dried and then printed.

One sample of each of the papers was printed without prior treatment.

Printing consisted in printing, on each sample, targets comprising four colors, black, yellow, cyan and magenta, using a KODAK PPM 200 printer and related ink at maximum density.

b) Treatment After Printing

On two samples, targets were printed comprising four colors, black, yellow, cyan and magenta, using a KODAK PPM 200 printer and related ink at maximum density.

One of the two samples was dipped in solution 1 as described in paragraph 2 for ten seconds and dried.

The other samples was dipped in solution 2 as described in paragraph 2 for ten seconds and dried.

The resulting treated elements correspond to the examples given in table II below by specifying the paper type used, the concentration of aluminosilicate polymer applied, and whether the treatment took place before or after printing.

TABLE II

| Treated element | Commercial name | Concentration in aluminosilicate polymer (%) | Treatment before or after printing |
|---|---|---|---|
| Ex. 1 (comp.) | Canon | — | — |
| Ex. 2 (inv.) | Canon | 5 | Before |
| Ex. 3 (inv.) | Canon | 10 | Before |
| Ex. 4 (inv.) | Canon | 5 | After |
| Ex. 5 (inv.) | Canon | 10 | After |
| Ex. 6 (comp.) | Fuji | — | — |
| Ex. 7 (inv.) | Fuji | 5 | Before |
| Ex. 8 (inv.) | Fuji | 10 | Before |
| Ex. 9 (inv.) | Fuji | 5 | After |
| Ex. 10 (inv.) | Fuji | 10 | After |
| Ex. 11 (comp.) | Tetenal | — | — |
| Ex. 12 (inv.) | Tetenal | 5 | Before |
| Ex. 13 (inv.) | Tetenal | 10 | Before |
| Ex. 14 (inv.) | Tetenal | 5 | After |
| Ex. 15 (inv. | Tetenal | 10 | After |

6) Evaluation of Dye Keeping Properties in Time and Evaluation of Gloss

To evaluate the dye keeping properties in time, a dye fading test by exposure to ozone was performed for each recording element obtained. For this, the color densities of each recording element were measured using a GretagMacbeth Spectrolino densitometer. Then the recording elements were placed in the dark in a room with controlled ozone atmosphere (60 ppb) for three weeks. Then any deterioration of color density was measured using the densitometer.

The gloss was measured for the various recording elements obtained using a Picogloss 560 apparatus (60° geometry) marketed by Erichsen.

FIG. 1 represents the gloss as well as the percentage of density loss observed for the maximum density for the four colors of the target after three weeks ozone exposure for examples 1 to 5. Letters K, C, M and Y represent the colors black, cyan, magenta and yellow respectively.

Figure 2:
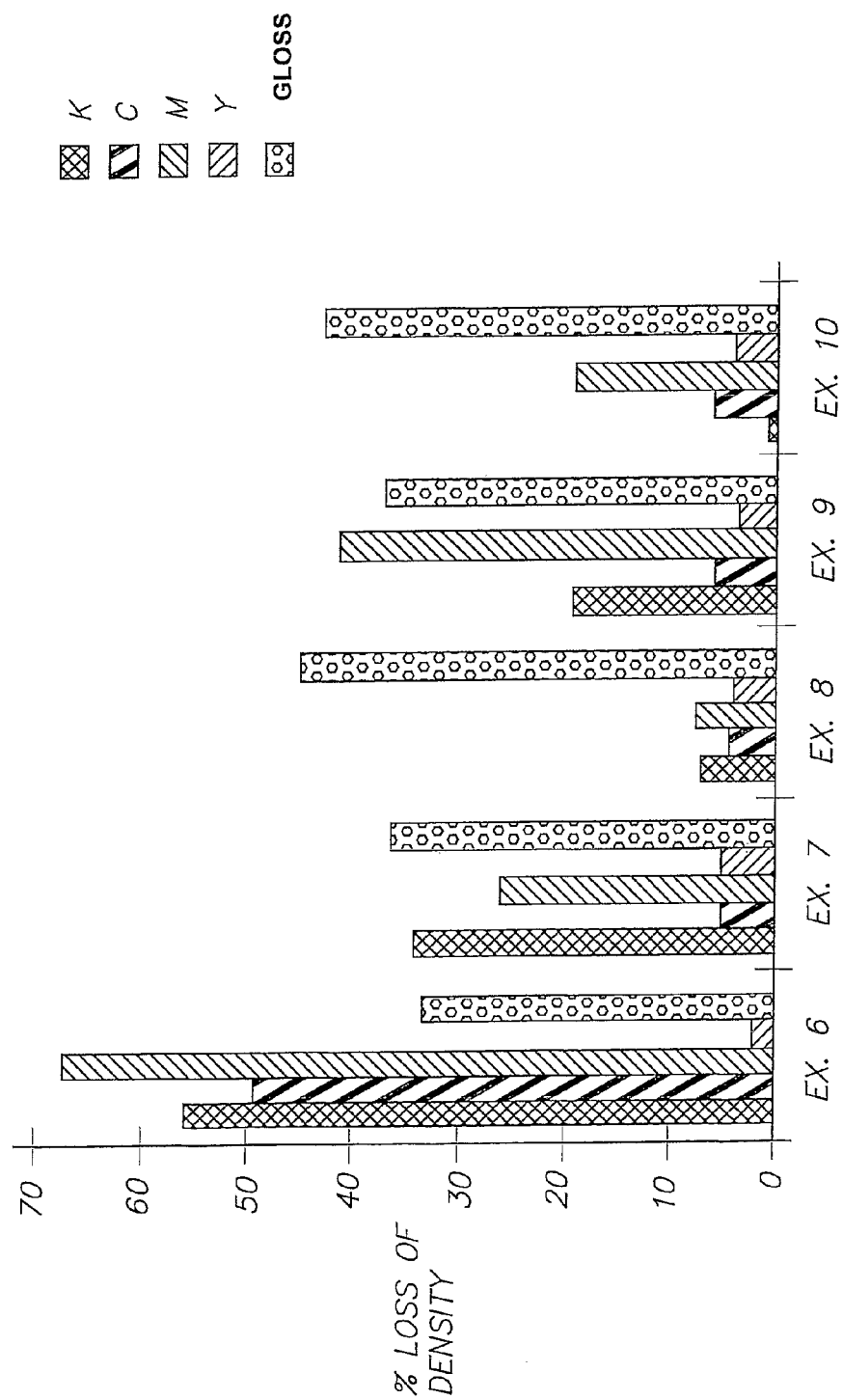

FIG. 2 represents the gloss as well as the percentage of density loss observed for the maximum density for the four colors of the target after three weeks ozone exposure for examples 6 to 10.

Figure 3:
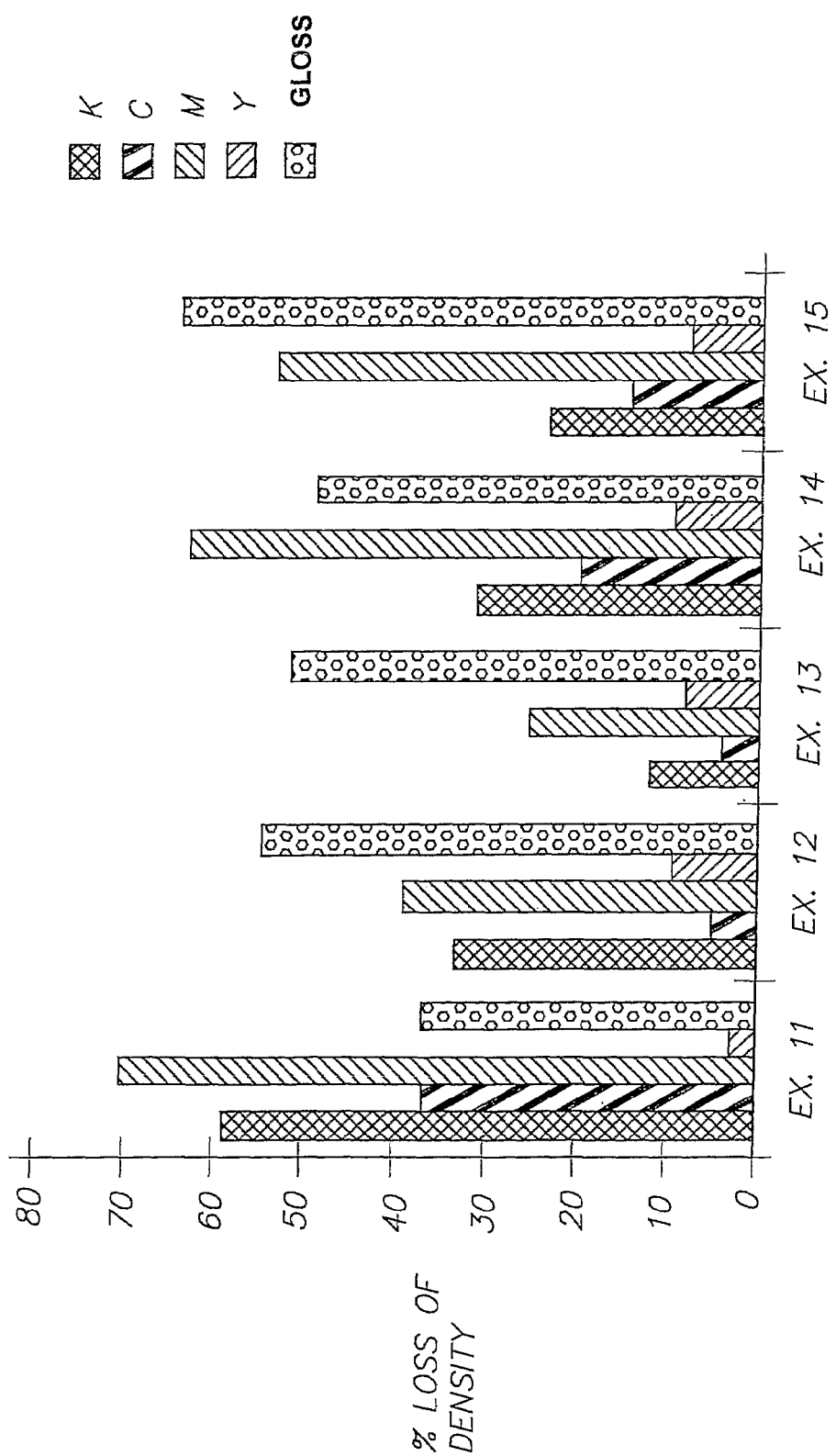

FIG. 3 represents the gloss as well as the percentage of density loss observed for the maximum density for the four colors of the target after three weeks ozone exposure for examples 11 to 15.

It may be seen that the recording elements treated according to the invention method (Examples 2 to 5, 7 to 10 and 12 to 15) have better dye keeping properties and thus greater stability to ozone than the comparative recording elements that were not treated. They also have improved gloss.

The method according to the invention thus enables the image quality to be improved of commercially available inkjet recording elements.

The invention claimed is:

1. A method for treating a pre-existing inkjet recording element comprising a support and at least one ink-receiving layer, whereby the stability to ozone and glossiness is improved compared with the untreated inkjet recording element, comprising applying a solution of an aluminosilicate polymer onto the printing surface of said untreated recording element, said aluminosilicate polymer obtained by a preparation method that comprises the following steps:

a) treating a mixed aluminum and silicon alkoxide of which the silicon has at least three hydrolyzable substituents, or a mixed aluminum and silicon precursor resulting from the hydrolysis of a mixture of aluminum compounds and silicon compounds having only hydrolyzable substituents and silicon compounds having at least three hydrolyzable substituents, with an aqueous alkali, in the presence of silanol groups, the aluminum concentration being maintained between $1.5 \times 10^{-2}$ and 0.3 mol/l, the Al/Si molar ratio being maintained between 1 and 3.6 and the alkali/Al molar ratio being maintained between 2.3 and 3;

b) stirring the mixture resulting from step a) at a temperature between 15° C. and 35° C. in the presence of silanol groups long enough to form the aluminosilicate polymer; and c) eliminating the by-products formed during steps a) and b) from the reaction medium.

2. The method according to claim 1, wherein the aluminosilicate polymer solution is applied before said recording element is printed.

3. The method according to claim 1, wherein the aluminosilicate polymer solution is applied after said recording element is printed.

4. The method according to claim 1, wherein the aluminosilicate polymer solution is applied by dipping the recording element in a bath containing said solution.

5. The method according to claim 1, wherein the aluminosilicate polymer solution is applied by spraying.

6. The method according to claim 1, wherein the alkali of step a) to prepare the aluminosilicate polymer is selected from the group consisting of sodium, potassium, and lithium hydroxide, diethylamine and triethylamine alkalis.

7. The method according to claim 1, wherein said alkali/Al molar ratio to prepare the aluminosilicate polymer is about 2.3.

8. The method according to claim 1, wherein said alkali/Al molar ratio to prepare the aluminosilicate polymer is about 3.

9. The method according to claim 1, wherein the method for preparing the aluminosilicate polymer comprises, after step b) and before step c), a step d), by which alkali is added in order to reach an alkali/Al molar ratio of 3 if this ratio has not already been reached in step a).

10. The method according to claim 1, wherein the mixed aluminum and silicon precursor resulting from hydrolysis of a mixture of aluminum compounds and silicon compounds having only hydrolyzable substituents and silicon compounds having at least three hydrolyzable substituents is a product resulting from the mixture in an aqueous medium (i) of a compound selected from the group consisting of aluminum salts, aluminum alkoxides and aluminum halogenoalkoxides and (ii) at least one compound selected from the group consisting of silicon alkoxides and chloroalkoxides having only hydrolyzable substituents, the silicon compound having at least three hydrolyzable substituents being selected to only have hydrolyzable substituents.

11. The method according to claim 10, wherein said mixed aluminum and silicon precursor is the product resulting from the mixture (i) of an aluminum halide and (ii) a silicon alkoxide having only hydrolyzable substituents.

12. The method according to claim 1, wherein said mixed aluminum and silicon precursor resulting from the hydrolysis of a mixture of aluminum compounds and silicon compounds having only hydrolyzable substituents and silicon compounds having at least three hydrolyzable substituents is a product resulting from the mixture in an aqueous medium (i) of a compound selected from the group consisting of aluminum salts, aluminum alkoxides and aluminum halogenoalkoxides and (ii) at least one compound selected from the group consisting of silicon alkoxides and chloroalkoxides having only hydrolyzable substituents, and (iii) at least one compound selected from the group comprising silicon and chloroalkoxides having three hydrolyzable substituents and one non-hydrolyzable substituent.

13. The method according to claim 12, wherein said mixed aluminum and silicon precursor is the product resulting from the mixture (i) of an aluminum halide and (ii) a mixture having at least one silicon alkoxide having only hydrolyzable substituents and at least one silicon alkoxide having three hydrolyzable substituents and one non-hydrolyzable substituent.

14. The method according to claim 13, wherein the ratio of silicon alkoxide having only hydrolyzable substituents to silicon alkoxide having three hydrolyzable substituents and one non hydrolyzable substituent is between 0.1 and 10 in moles silicon.

15. The method according to claim 12, wherein the silicon alkoxide having three hydrolyzable substituents and one non-hydrolyzable substituent is represented by the formula

where R represents an alkyl group comprising 1 to 5 carbon atoms R' represents H, F, or a substituted or unsubstituted linear or branched alkyl or alkenyl group comprising 1 to 8 carbon atoms.

16. The method according to claim 15, wherein R' represents a methyl, ethyl, n-propyl, n-butyl, 3-chloropropyl, or vinyl group.

17. The method according to claim 16, wherein said silicon alkoxide having three hydrolyzable substituents and one non-hydrolyzable substituent is methyltriethoxysilane or vinyltriethoxysilane.

18. The method according to claim 10, wherein said silicon alkoxide having only hydrolyzable substituents is tetramethyl orthosilicate or tetraethyl orthosilicate.

* * * * *